(12) United States Patent
Haag et al.

(10) Patent No.: US 11,590,538 B2
(45) Date of Patent: Feb. 28, 2023

(54) BULK MATERIAL CLEANER WITH INTEGRATED AIR SEPARATOR, AND BULK MATERIAL CLEANER WITH A HOLLOW SUPPORT FRAME

(71) Applicant: BÜHLER AG, Uzwil (CH)

(72) Inventors: Roman Haag, Eschlikon (CH); Jürgen Moosmann, Berg (DE)

(73) Assignee: BÜHLER AG, Uzwil (CH)

( * ) Notice: Subject to any disclaimer, the term of this patent is extended or adjusted under 35 U.S.C. 154(b) by 0 days.

(21) Appl. No.: 17/267,118

(22) PCT Filed: Aug. 20, 2019

(86) PCT No.: PCT/EP2019/072273
§ 371 (c)(1),
(2) Date: Feb. 9, 2021

(87) PCT Pub. No.: WO2020/038947
PCT Pub. Date: Feb. 27, 2020

(65) Prior Publication Data
US 2021/0308721 A1    Oct. 7, 2021

(30) Foreign Application Priority Data
Aug. 20, 2018    (EP) .................................... 18189802

(51) Int. Cl.
*B07B 1/34*    (2006.01)
*B07B 7/086*    (2006.01)
*B01D 45/16*    (2006.01)

(52) U.S. Cl.
CPC .............. *B07B 7/086* (2013.01); *B01D 45/16* (2013.01); *B07B 1/34* (2013.01)

(58) Field of Classification Search
CPC .. B07B 7/086; B07B 1/34; B07B 9/00; B07B 4/08; B01D 45/16
See application file for complete search history.

(56) References Cited

U.S. PATENT DOCUMENTS 1,720,861 A     7/1929  Stebbins
2,713,942 A  *  7/1955  Von Rechenberg ...... B07B 1/30
                                                       209/318

(Continued)

FOREIGN PATENT DOCUMENTS

CH          422 491          4/1967
CN          85104117 A       12/1986
(Continued)

OTHER PUBLICATIONS

European Office Action Corresponding to 18189802.4 dated Nov. 5, 2020.

(Continued)

*Primary Examiner* — Patrick H Mackey
(74) *Attorney, Agent, or Firm* — Finch & Maloney PLLC (57) ABSTRACT

Bulk material cleaner (1) comprising a support frame (2) and a screen housing (3), which can be oscillated and/or vibrated by a drive (5). At least one screen (6) is arranged in the screen housing (3). The screen housing has a feed opening (7) and at least two outlet openings (8, 9), the outlet openings (8, 9) being for a first fraction (F1) and a second fraction (F2), respectively. Moreover, the bulk material cleaner (1) comprises an air separator (10), which is only fastened on the screen housing (3).

8 Claims, 6 Drawing Sheets

(56) References Cited

U.S. PATENT DOCUMENTS

| | | | |
|---|---|---|---|
| 3,380,585 A * | 4/1968 | Salete | B02B 1/02 |
| | | | 209/318 |
| 4,219,410 A | 8/1980 | Herder | |
| 4,636,305 A * | 1/1987 | Mueller | B07B 4/08 |
| | | | 209/318 |
| 4,721,561 A | 1/1988 | Oetiker et al. | |
| 4,806,235 A | 2/1989 | Mueller | |
| 4,971,684 A | 11/1990 | Mueller | |
| 5,538,139 A | 7/1996 | Keller | |
| 8,061,523 B2 * | 11/2011 | Uebayashi | B07B 4/08 |
| | | | 209/20 |
| 10,143,135 B2 * | 12/2018 | Xu | A01D 41/1277 |
| 10,639,645 B2 * | 5/2020 | Stroitelev | B07B 4/08 |
| 2002/0178697 A1 | 12/2002 | Oh et al. | |
| 2008/0087581 A1 * | 4/2008 | Eisenhut | B07B 4/08 |
| | | | 209/318 |

FOREIGN PATENT DOCUMENTS

| | | |
|---|---|---|
| CN | 1389175 A | 1/2003 |
| CN | 105233970 A | 1/2016 |
| DE | 29 50 217 B1 | 7/1981 |
| DE | 41 13 093 A1 | 10/1991 |
| EP | 0 155 556 A2 | 9/1985 |
| EP | 0 694 341 A1 | 1/1996 |
| GB | 1 080 911 | 8/1967 |
| WO | 88/04204 A1 | 6/1988 |

OTHER PUBLICATIONS

European Search Report Corresponding to 18189802.4 dated Mar. 25, 2019.
European Search Report Corresponding to 18189802.4 dated May 28, 2019.
International Search Report Corresponding to PCT/EP2019/072273 dated Oct. 22, 2019.
Chinese Office Action Corresponding to 201980052046.9 dated May 6, 2022.
General Machinery and Equipment for Building Materials (Chinese Textbook), ed. Chu, Yuqing, pp. 304-306, Wuhan University of Technology Press, Published Sep. 30, 1996 See Chinese Action.
Chinese Office Action corresponding to 201980052046.9 dated Oct. 14, 2022.

* cited by examiner

BULK MATERIAL CLEANER WITH INTEGRATED AIR SEPARATOR, AND BULK MATERIAL CLEANER WITH A HOLLOW SUPPORT FRAME

This application is a National Stage completion of PCT/EP2019/072273 filed Aug. 20, 2019, which claims priority from European patent application serial no. 18189802.4 filed Aug. 20, 2018.

FIELD OF THE INVENTION

The invention relates to a bulk material cleaning device according to the preamble of the independent claims.

BACKGROUND OF THE INVENTION

Bulk material cleaning devices are used in particular in grain processing for cleaning, classifying and/or separating and for sorting out stones.

Known bulk material cleaning devices comprise a housing with at least one screen. The housing is set into a vibrating motion by means of a drive, so that separation takes place by means of the screen. At the same time, an air flow is generated in the housing, also causing a separation of particles and dust in the product flow.

The air flow is generated by means of a suction device, which is located next to the bulk material cleaning device and is connected to the housing by means of suction lines. An air separator is part of the suction device.

Due to the length of the suction lines, such an arrangement is very energy-intensive in operation. In addition, such bulk material cleaning devices require a lot of space.

SUMMARY OF THE INVENTION

It is therefore the problem of the present invention to provide a device which avoids the disadvantages of the prior art and, in particular, is compact in design and allows for energy savings during operation.

This problem is solved by a bulk material cleaning device according to the characterizing part of the independent claim(s).

The bulk material cleaning device comprises a support frame and a screen housing which is mounted on the support frame by means of spring elements in such a way that it can be set into oscillation and/or vibration by a drive.

In particular, the movement is a vibrational movement. A vibrational movement in the sense of the present patent application is a motion of the screen housing in which a hopping motion is imparted on bulk material. In other words, this means that bulk material is accelerated from a screen surface of a screen in a direction which is not in the plane of the screen surface.

At least one screen for separating bulk material into a first fraction and a second fraction is arranged in the screen housing.

The screen housing has a feed opening for the product to be processed and at least two outlet openings, one for the first fraction and one for the second fraction.

According to the invention, the bulk material cleaning device further comprises an air separator, which is only attached to the screen housing, so that the air separator can also be set into oscillation and/or vibration by the drive.

By placing the air separator directly on the bulk material cleaning device, the bulk material cleaning device can be built more compactly. In addition, no long lines are required to guide the air flow. The energy consumption of a bulk material cleaning device according to the invention is therefore lower compared to bulk material cleaning devices according to the prior art.

The air flow is preferably generated by an external suction device, which is fluidically connected to the air separator arranged on the screen housing.

This can provide a particularly space-saving bulk material cleaning device, as no external separator is required.

The air separator is preferably attached to an upper side of the screen housing. In particular, the cap of the screen housing is at least partially designed as an air separator. The air flow in the screen housing is thereby preferably guided essentially vertically with respect to a product flow. This means that the air flow is guided essentially perpendicular to a screen surface of a screen.

The air separator is preferably a centrifugal separator, which in particular has a tangential suction that extends over an entire length of the centrifugal separator.

The longitudinal direction of the centrifugal separator corresponds to the axial direction of the airflow vortex generated in the centrifugal separator.

With a centrifugal separator according to the invention, a high degree of separation can be achieved.

The tangential suction unit preferably comprises at least one guide vane, which is designed to generate a swirl in the air flow during suction and supports the formation of the air flow vortex in the centrifugal separator. Preferably, there are several guide vanes.

The centrifugal separator preferably comprises a jacket with a rotationally symmetrical inner jacket surface and an inner element arranged coaxially thereto. The inner element is provided with air passage openings and extends over the entire length of the centrifugal separator.

The air passage openings of the inner element are preferably formed along the entire length of the inner element.

This allows a uniform flow to be generated along the entire length of the centrifugal separator.

The air passage openings of the inner element are preferably provided with guide elements which effect a deflection/deceleration of the air flow in the space between the jacket and the inner element. The deflection of the air flow particularly preferably causes a reversal of the direction of rotation of the air flow. This means that if, for example, a clockwise air flow is generated by the guide vanes in the space between the jacket and the inner element, a counter-clockwise air flow is generated by the air passage openings of the inner element inside the inner element or at least in the region of the wall of the inner element.

The inner jacket surface and the inner element are preferably frustoconical in shape.

This allows the air velocity to be kept largely constant so that pressure losses along the length of the centrifugal separator are minimized, especially if the opening angle of the inner jacket surface and the inner element is adapted to the air extraction volume, length of the centrifugal separator, suction surface of the tangential extraction, etc.

The support frame of the bulk material cleaning device is preferably hollow, with at least one outlet opening of the screen housing opening into the support frame.

The support frame serves both as a support for the screen housing and as a product guide for at least one fraction.

By routing the fraction(s) inside the support frame, space can be saved as no additional lines are required. In addition, modularity is made possible, as several screen housings can be arranged on top of each other without having to provide additional lines.

The invention further relates to a bulk material cleaning device comprising a support frame and at least two treatment devices selected from a drum screen, a sorting and classifying device, a stone sorting device, a light material separator, an aspiration channel/tarar and a magnetic separator.

Known bulk material cleaning arrangements usually comprise several of the above-mentioned treatment devices, which, however, are designed separately and are connected to each other via lines. Accordingly, the space requirements of known bulk material cleaning arrangements are very large.

It is therefore the problem of the present invention to provide a device which avoids the disadvantages of the prior art and, in particular, is compact and modular in design.

This problem is solved with a bulk material cleaning device according to the characteristic part of the independent claim(s).

For the purposes of the present invention, the term "drum screen" describes a device in which bulk material enters a rotating screen drum via a feed opening, wherein, by rotating the screen drum, the bulk material moves somewhat upwards in the direction of rotation to an open drum end face and is thereby rearranged, so that also upper material layers of the bulk material come into contact with a screen jacket of the screen drum and are screened, wherein a first fraction comprising finer bulk material passes the screen jacket, whereas a second fraction comprising coarser particles and long fibers (e.g., bag bands, corn cobs, corn leaves, etc.) is kept moving in the rotating screen drum and transported to the open drum face. The first fraction and the second fraction then exit the device through corresponding outlet openings.

For the purposes of the present invention, a sorting and classifying device is defined as a device in which bulk material, which is fed to the device via a feed opening, is separated with the aid of a separating system of screens into a first fraction comprising bulk materials, in particular granular food products such as grain, from coarse admixtures such as large grains, strings, straw, wood, stones or clods of earth and fine impurities such as sand and broken material, which constitute a second fraction. The first fraction and the second fraction then leave the device through corresponding outlet openings.

For the purposes of the present invention, a stone sorting device is a device in which bulk material fed to the device via a feed opening is stratified according to specific weight with the aid of an oscillating movement of a pre-separation table and air flowing through from bottom to top. Light parts and heavy parts (with the stones) then leave the device through corresponding outlet openings.

For the purposes of the present invention, a device in which bulk materials, in particular granular food products such as grain, are classified and separated into several fractions (e.g. heavy, mixed and light product) is referred to as a light material separator. The classification and separation is carried out by means of an air flow, which divides the bulk material supplied to the device via a feed opening into several fractions (e.g. heavy, mixed and light product) according to specific weight. The fractions then leave the device through corresponding outlet openings.

For the purposes of the present invention, an aspiration channel/tarar is a device in which bulk material fed to the device via a feed opening is freed from light particles by means of adjustable air distribution. Bulk material and light particles then leave the device through corresponding outlet openings.

For the purposes of the present invention, a magnetic separator is a device in which bulk material fed to the device via a feed opening is freed from metal parts by means of magnets. Bulk material and metal parts then leave the device through corresponding outlet openings.

As described above, each treatment device includes at least one feed port and at least one outlet port.

According to the invention, the treatment devices are mounted on the support frame, wherein the mounting can be direct or indirect, e.g. by means of spring elements.

The support frame is hollow at least in some regions.

According to the invention, at least one outlet opening of a treatment device opens into the support frame, the support frame also opening into the feed opening of a treatment device.

Preferably, the outlet opening of a first treatment device opens into the support frame, wherein the support frame opens into the feed opening of a second treatment device, which is arranged downstream of the first treatment device.

The support frame thus serves as a connecting line between the outlet opening of the first treatment device and the feed opening of the second treatment device.

However, it can be seen that any combination is possible. For example, three treatment devices can be supported on the support frame, with two fractions, which have been separated from each other by the first treatment device, each being directed to a second and third treatment device, respectively, via the hollow support frame (the first fraction to the second treatment device and the second fraction to the third treatment device). Also, the support frame may be formed such that a plurality of connecting lines are defined therein so that different fractions can be directed to different treatment devices, or fractions from different treatment devices can be directed in the same support frame.

In this way, a modular bulk material cleaning device can be provided in which several treatment devices can be fluidly connected to each other using a standard support frame. There is no need to provide separate connecting lines.

BRIEF DESCRIPTION OF THE DRAWINGS

The invention is better described below with reference to a preferred embodiment in conjunction with the figures. It is shown.

DETAILED DESCRIPTION OF THE PREFERRED EMBODIMENTS

Figure 1:
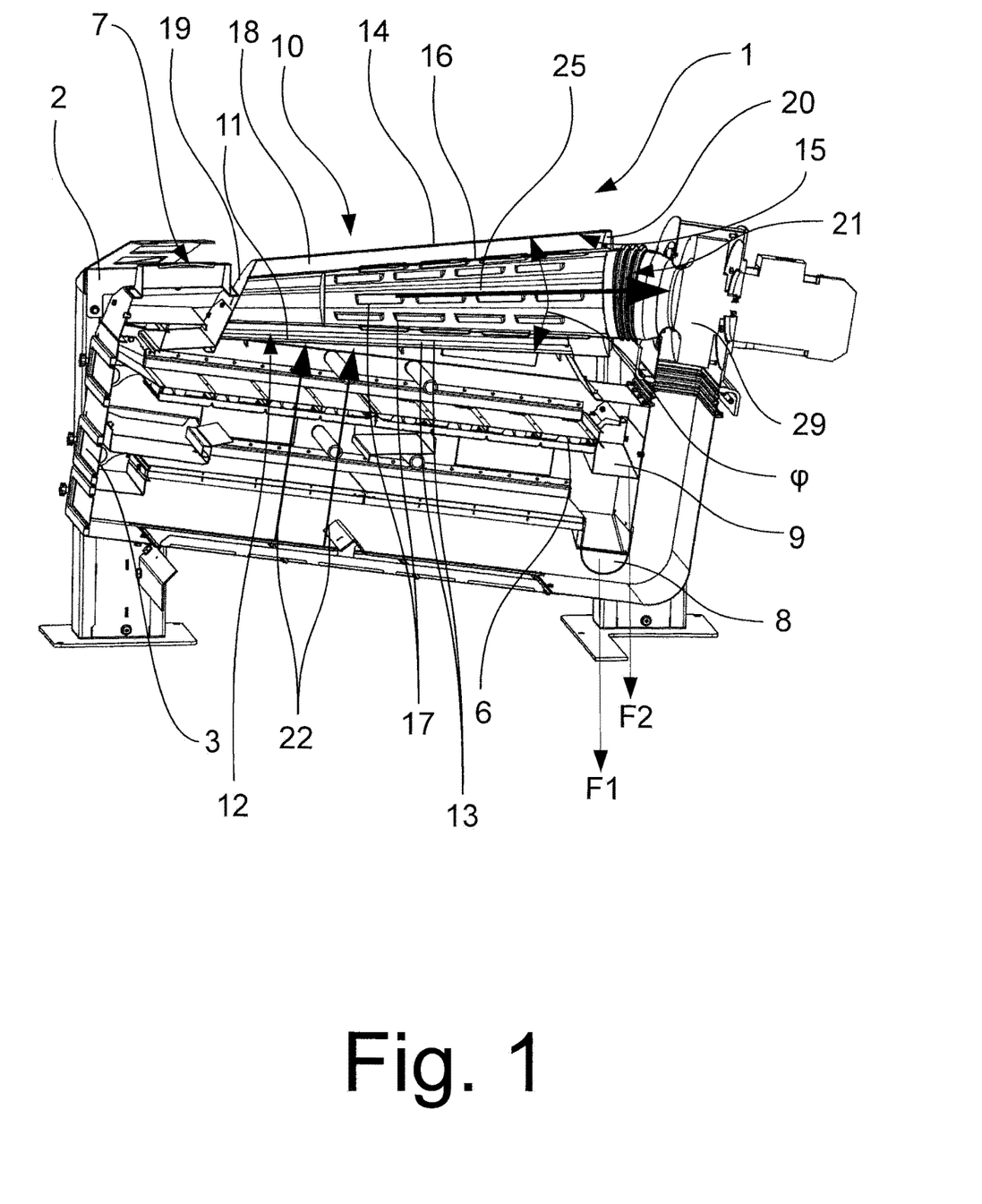
FIG. 1 a perspective sectional view through a bulk material cleaning device according to the invention.

FIG. 1 shows a bulk material cleaning device 1. The bulk material cleaning device 1 comprises a support frame 2, which carries a screen housing 3. The screen housing 3 is mounted on spring elements which are not visible and can be set into a vibrational motion by means of a drive which is not shown. A spring element 4 and the drive 5 are visible in FIG. 4.

A screen 6 is arranged inside the screen housing. Bulk material is fed to the bulk material cleaning device 1 through the feed opening 7 and separated into a first fraction F1 and a second fraction F2, which leave the bulk material cleaning device 1 through the outlets 8 and 9.

Figure 3:
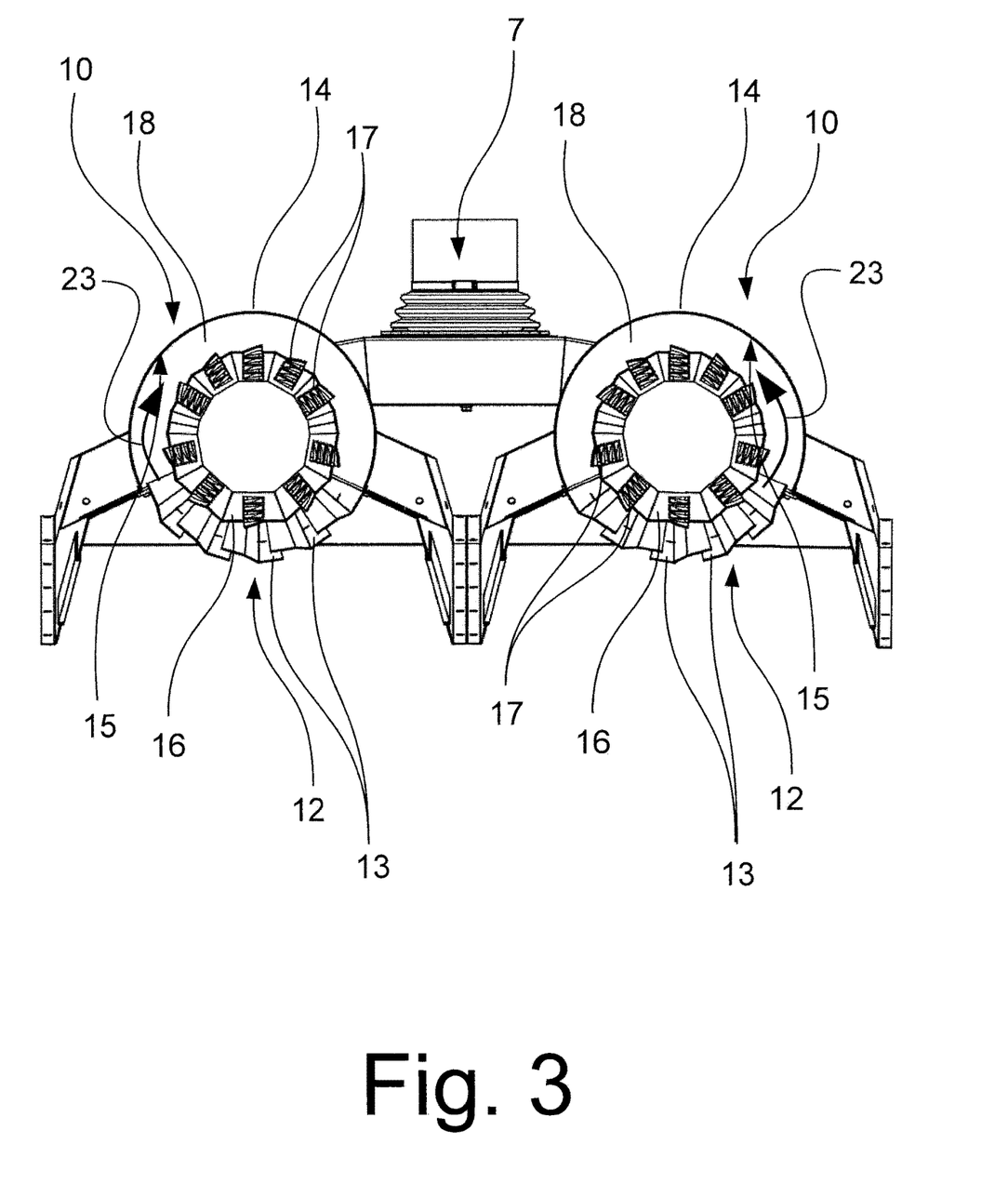
FIG. 3 a cross-sectional view through an air separator of the bulk material cleaning device of FIG. 1, and FIG. 4 a perspective view of a variant of the bulk material cleaning device according to the invention, FIG. 5 a detailed view of the bulk material cleaning device of FIG. 4, and FIG. 6 a schematic side view of a further bulk material cleaning device according to the invention.

Two air separators 10 are arranged next to each other on an upper side 11 of the screen housing 3, which are shown separately in FIG. 3.

Figure 2:
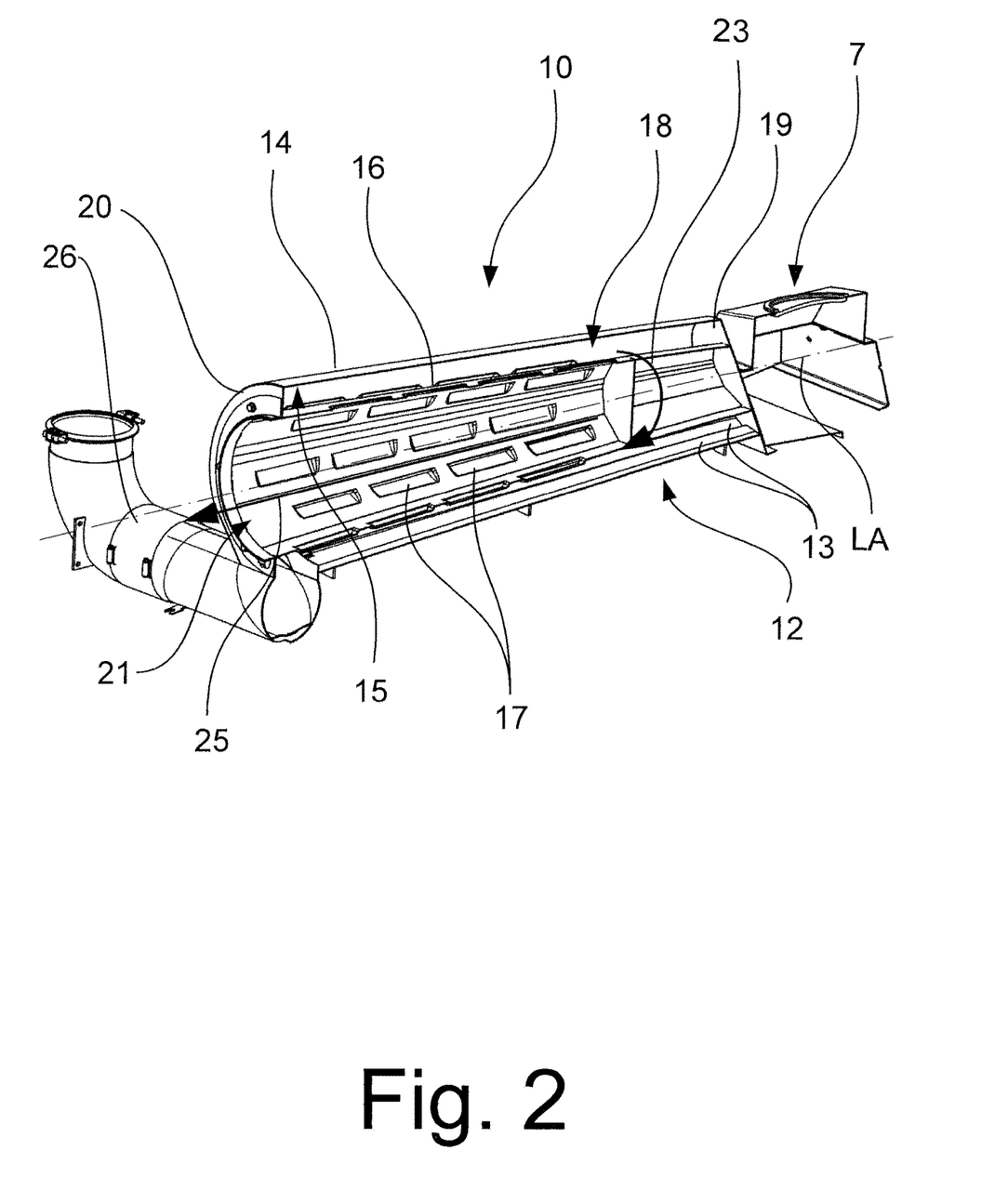
FIG. 2 a perspective detailed view in longitudinal section through an air separator of the bulk material cleaning device of FIG. 1.

The air separator 10 is formed as a cover of the bulk material cleaning device 1 and comprises a jacket 14 with a frustoconical inner jacket surface 15 with an opening angle φ. Inside the jacket 14 and coaxially therewith is an inner frustoconical element 16 extending along the entire length of the jacket 14. The longitudinal direction of the jacket 14 and the inner element 16 is defined by the longitudinal axis LA.

The inner element 16 also has an opening angle φ so that an annular space 18 with a constant radial gap width is formed between the jacket surface 15 and the inner element 16.

The top surface 19 of the jacket 14 is closed, while the base surface of the jacket 14 is only partially closed by a ring 20, exposing an opening 21 having the diameter of the base surface of the inner element 16.

The inner element 16 is provided with air passage openings 17. The area of the jacket 14 facing the interior of the screen housing 3 serves as a tangential suction 12 and has a plurality of guide vanes 13.

When the bulk material cleaning device 1 is operated, a negative pressure is generated at the opening 21 by a suction device 26 and/or a radial fan 29, which are only shown schematically in FIG. 1. Air in the interior of the screen housing 3 thus flows from below in the direction of the upper side 11, as shown schematically by the arrows 22, and entrains lighter particles.

The guide vanes 13 cause a deflection of the air flow and create a swirl in the annular space 18, so that a vortex flow is created in the annular space 18, which is shown schematically by the arrow 23. The vortex flow separates the particles centrifugally from the air flow, and those are then either subjected to a further process via the line 26 or collected as waste.

The purified air flow passes through the air passage openings 17, which are also provided with baffles that cause deflection of the air flow, and reaches the opening 21, as shown schematically by the arrow 25, where it is either directed to the outside or returned to the screen box.

Figure 4:
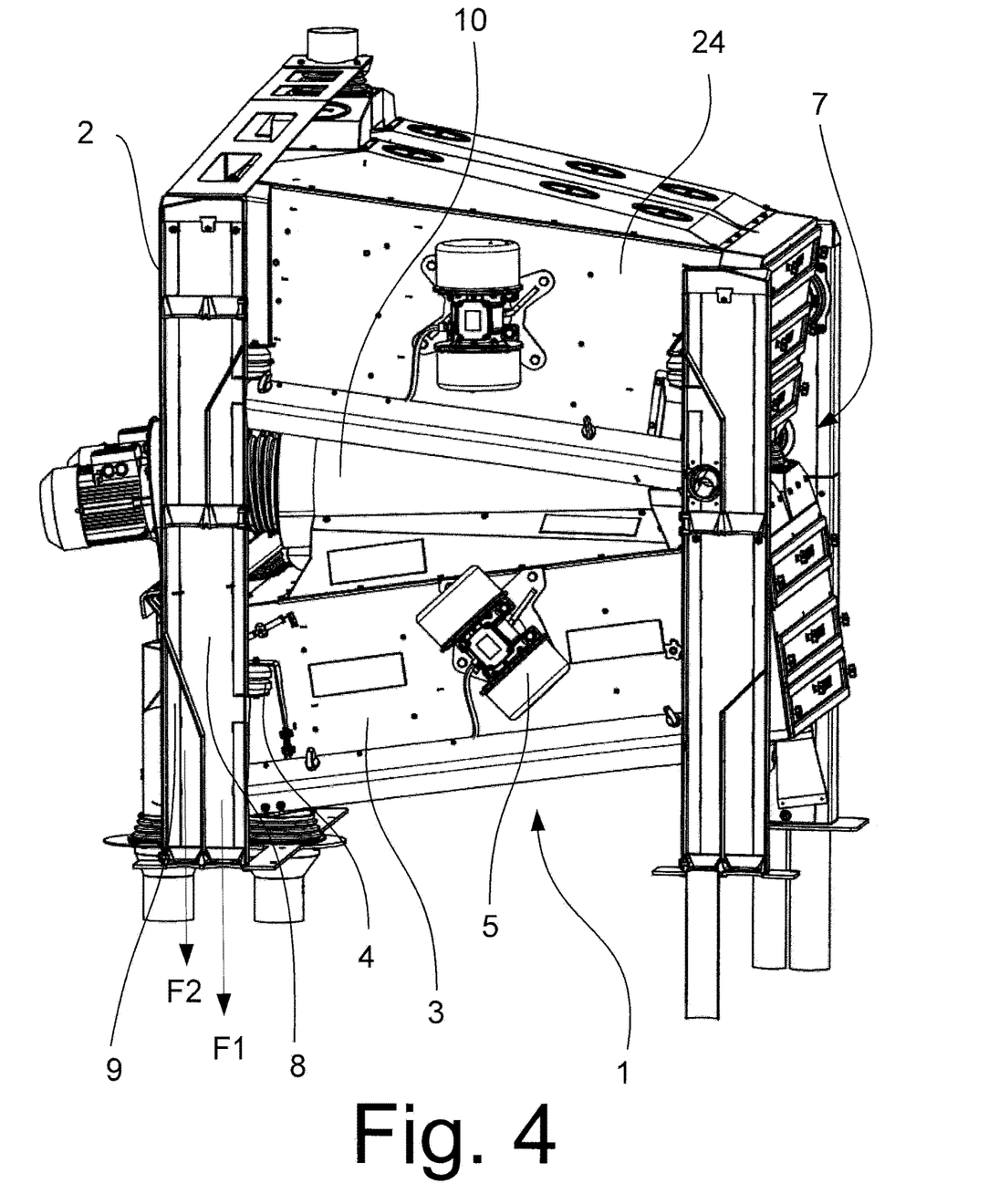
Figure 5:
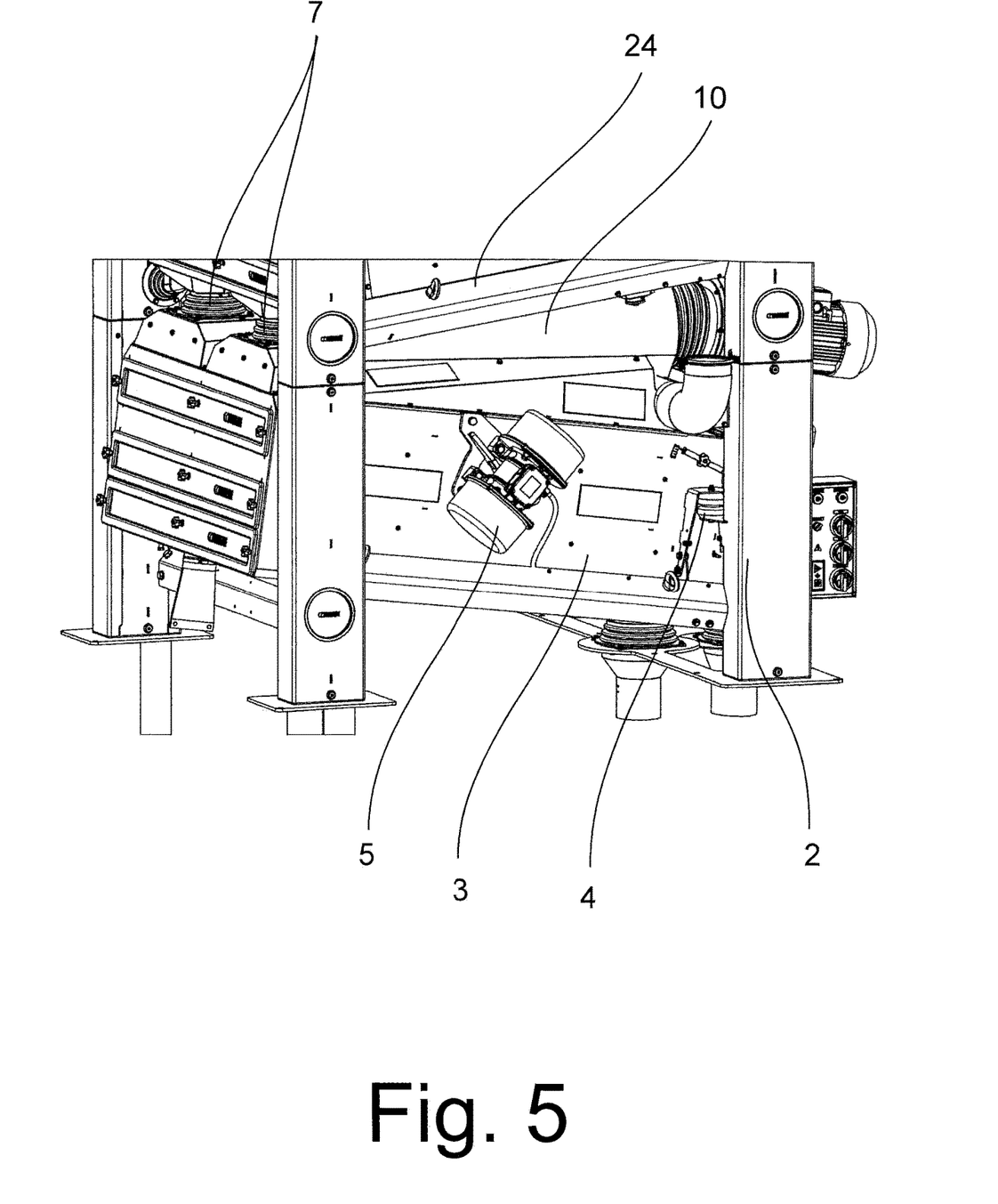

FIGS. 4 and 5 show a variant of the bulk material cleaning device 1 in which a spring element 4 and the drive 5 are visible. The bulk material cleaning device 1 is designed as described above, wherein, in contrast to the bulk material cleaning device 1 described above, the outlet openings 8 and 9 open into a cavity of the support frame 2, so that no external lines are necessary. This is shown schematically in FIG. 4, according to which two channels for the fractions F1 and F2 are formed in the support frame 2. In particular, a further device 24, which may be a bulk cleaning device 1, can be arranged above the bulk material cleaning device 1 without the need to provide additional lines.

Figure 6:
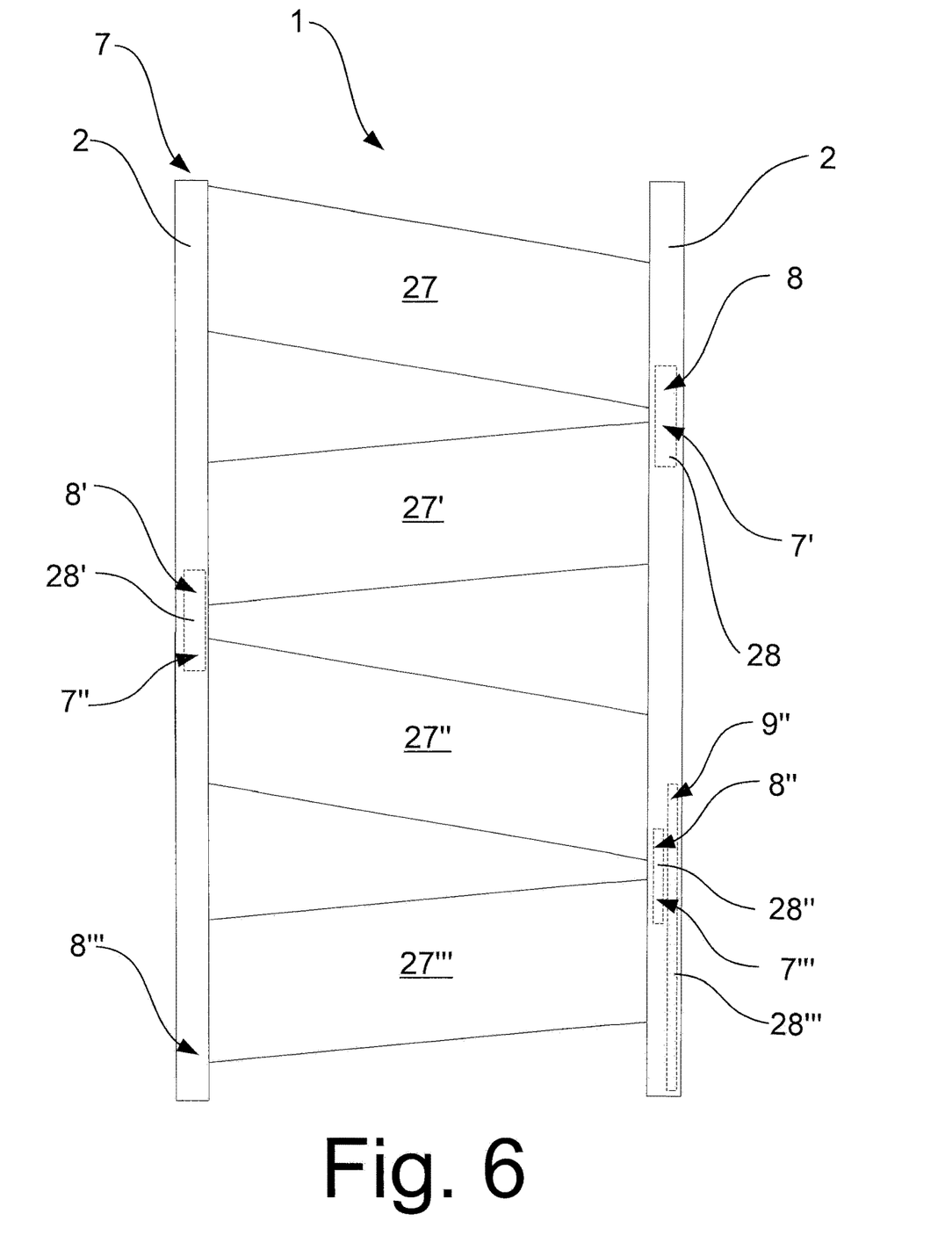

FIG. 6 schematically diagram shows a bulk material cleaning device 1.

The bulk material cleaning device 1 comprises several treatment devices 27, 27', 27" and 27''', which are mounted on a support frame 2. The mounting can be provided by means of spring elements as described above or directly, e.g. by means of screws or bolts.

The treatment device 27, 27', 27" or 27''' may be a drum screen, a sorting and classifying device, a stone sorting device, a light material separator, an aspiration channel/tarar, or a magnetic separator.

Each treatment device 27, 27', 27" or 27''' has at least one feed opening 7, 7', 7" or 7''', respectively, and an outlet opening 8, 8', 8", 9" or 8''', respectively.

Since the feed openings 7, 7', 7" and 7''' and the discharge openings 8, 8', 8", 9" and 8''' are located in an area covered by the support frame 2, they are only indicated by an arrow.

The support frame 2 is hollow. The outlet opening 8 of the treatment device 27 opens into the support frame 2. The support frame 2 in turn opens into the feed opening 7' of the treatment device 27', which is arranged downstream of the treatment device 27 in the product flow direction. A connecting line 28, which fluidically connects the outlet opening 8 with the feed opening 7' and is shown schematically by the dashed line, is thus formed by the hollow support frame 2.

Downstream of the treatment device 27', a further treatment device 27" is arranged on the support frame 2. Analogous to the example described above, the outlet opening 8' of the treatment device 27' and the feed opening 7" of the treatment device 27" are fluidically connected via a connecting line 28', which is formed by a section of the hollow support frame 2.

Downstream of the treatment device 27", another treatment device 27''' is arranged on the support frame 2. In this case, the treatment device 27" has two outlet openings 8" and 9" which open into the support frame 2, the hollow support frame 2 forming two parallel connecting lines 28" and 28'''. The connecting line 28" connects the outlet opening 8" of the treatment device 27" to the feed opening 7''' of the treatment device 27'''. The outlet opening 9" opens into the connecting line 28'''. The connecting line 28''' can, for example, serve as a waste line or lead to a further treatment device arranged downstream of the treatment device 27'''.

It can thus be seen that, depending on the choice of the different treatment devices 27, 27', 27" and 27''', the support frame 2 allows flexibility and modularity of the structure of the bulk material cleaning device 1.

The invention claimed is:

1. A bulk material cleaning device comprising:
    a support frame, and
    a screen housing which is mounted on the support frame by spring elements in such a way that the screen housing can be set in oscillation and/or vibration by a drive,
    wherein at least one screen is arranged in the screen housing for separating bulk material into a first fraction and a second fraction,
    the screen housing having an inlet opening and at least two outlet openings, respectively, for the first fraction and the second fraction, and
    the bulk material cleaning device further comprises an air separator which is only attached to the screen housing so that the air separator can also be set into oscillation and/or vibration by the drive,
    wherein the air separator is a centrifugal separator which comprises a jacket having a rotationally symmetrical inner jacket surface and an inner element that is arranged coaxially thereto and has air passage openings, and the inner element extends over an entire length of the centrifugal separator.

2. The bulk material cleaning device according to claim 1, wherein the air separator is attached to an upper side of the screen housing.

3. The bulk material cleaning device according to claim 1, wherein the centrifugal separator comprises a tangential suction over an entire length of the centrifugal separator.

4. The bulk material cleaning device according to claim 3, wherein the tangential suction comprises at least one guide vane which is designed to generate a swirl of an air flow.

5. The bulk material cleaning device according to claim 1, wherein the air passage openings of the inner element are formed over an entire length of the inner element.

6. The bulk material cleaning device according to claim 1, wherein the inner jacket surface and the inner element are frustoconical.

7. The bulk material cleaning device according to claim 1, wherein the air passage openings are provided with guide elements which effect a deflection of the air flow.

8. The bulk material cleaning device according to claim 1, wherein the support frame is hollow and at least one outlet opening opens into the support frame.

* * * * *